March 8, 1932.  C. E. HICKS ET AL  1,849,007

HELICOPTER

Filed April 10, 1930   2 Sheets-Sheet 1

WITNESSES

INVENTORS
Charles E. Hicks
W. Grant Hicks
BY Munn & Co.
ATTORNEYS

March 8, 1932.　　C. E. HICKS ET AL　　1,849,007
HELICOPTER
Filed April 10, 1930　　2 Sheets-Sheet 2

WITNESSES

INVENTORS
Charles E. Hicks
BY W. Grant Hicks
Munn & Co
ATTORNEYS

Patented Mar. 8, 1932

1,849,007

UNITED STATES PATENT OFFICE

CHARLES E. HICKS AND WILLIAM GRANT HICKS, OF MECHANICVILLE, NEW YORK

HELICOPTER

Application filed April 10, 1930. Serial No. 443,228.

This invention relates to an improvement in helicopter aircraft, and has especial reference to the construction of helicopter elements of the type shown in United States Letters Patent, No. 1,398,781, granted to us.

The principal object of the invention is the provision of an improved form of helicopter element which is capable of producing a comparatively increased lifting action and at the same time one which is capable of producing translatory motion of the aircraft, and one which reduces drag to the minimum, and one which does not materially affect the aerodynamic balance of the aircraft.

The nature of the invention and its distinguishing features and advantages will appear when the following specification is read in connection with the accompanying drawings, in which Figure 1 is a side view of a helicopter element constructed in accordance with the invention;

It is to be understood that an aircraft or flying machine will be equipped with one or more of the helicopter elements, each mounted at the most advantageous point, to rotate around a vertical or nearly vertical axis, and driven by power derived from the power plant of the aircraft. It is also to be understood that the aircraft will be equipped with one or more co-operative propellers which cause translatory motion of the aircraft.

Figure 1:
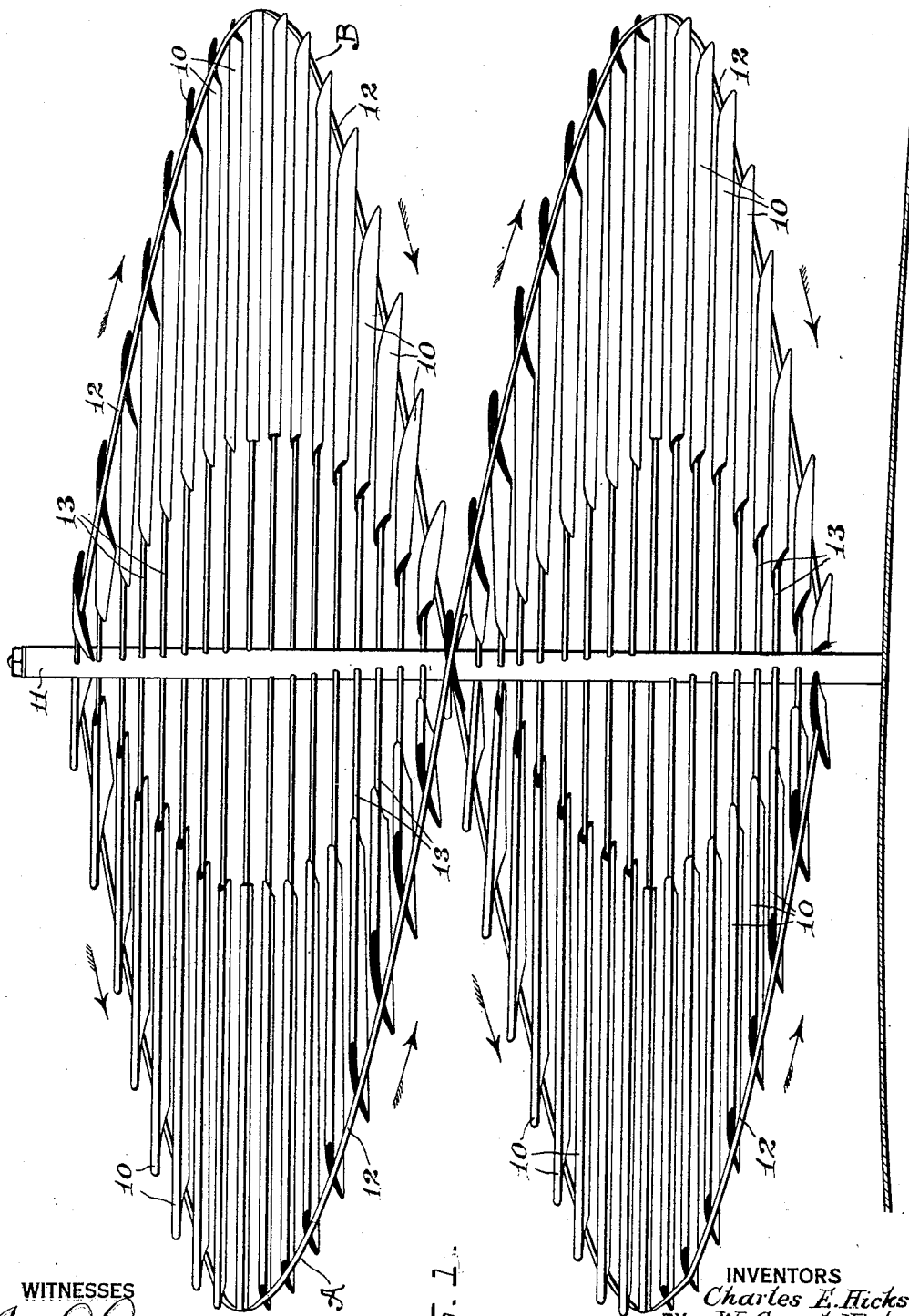
Figure 2:
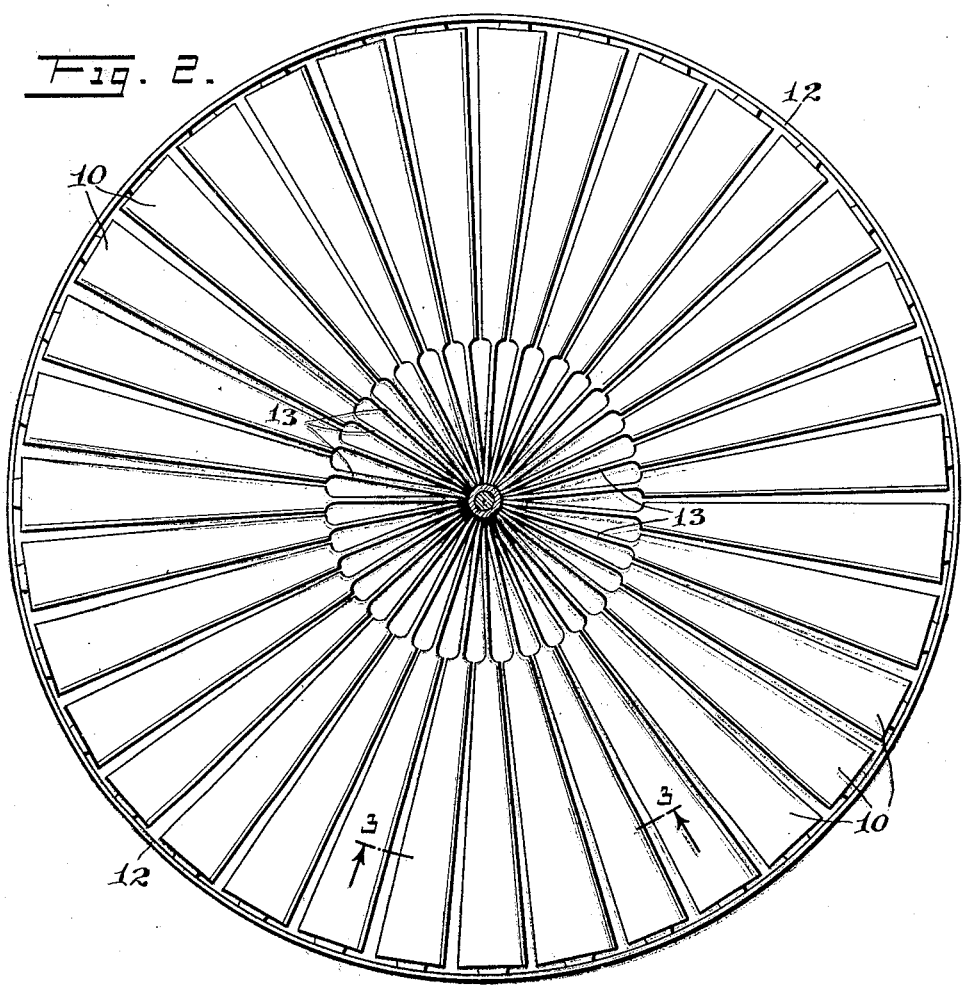
Figure 2 is a plan view.
Figure 3:
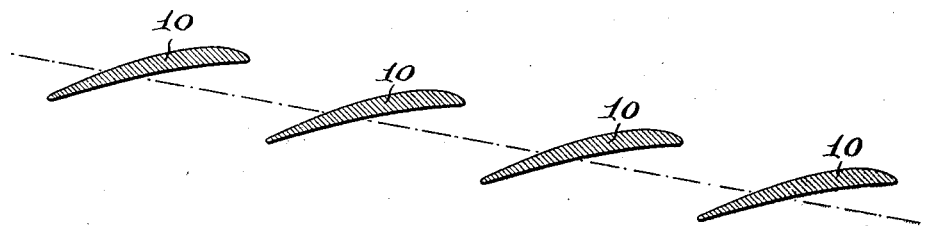
Figure 3 is an enlarged section taken on the line 3—3 of Figure 2, and looking in the direction indicated by the arrows.

In accordance with the invention a helicopter element comprises airfoils or wings 10, which are secured to and extend radially outward from a hollow driven shaft 11. There are two groups of wings 10, and the wings 10 of each group extend radially outward from the same section of the shaft 11. The groups of wings are designated A and B. The wings of each group are arranged to form a helix with respect to the axis around which they rotate. The wings of group A are arranged severally in the form of a helix starting from a point on one side of the shaft 11, and the wings of group B are arranged similarly to those of group A, starting from a point on the shaft directly and diametrically opposite group A. Each wing 10 is preferably concavo-convex in cross-section, or, in other words, it may have a double convex camber in profile. The wings 10 of each helix group are relatively disposed so that the leading edge of each wing will be disposed above and behind the trailing edge of the next adjacent wing in an advanced position with respect thereto, as shown most clearly in Figure 3. The outer ends of the wings 10 of each group may be joined by rods, or by a continuous member 12 in the form of a helix. The inner end of each wing is connected in any suitable manner with the shaft 11, this being done in the present instance by an outrigger 13. In Figure 1, the arrows indicate the direction in which the wings are travelling when the shaft 11 is rotating counter-clockwise when looking down on the upper end of the shaft.

From the foregoing it will be understood that a helicopter element constructed as set forth, when put in motion, will generate a lifting action, and also a translatory movement, in which certain of the wings 10, which are disposed at one side of the line of flight, will produce the lifting action, while certain other wings, on the opposite side of the line of flight, will react to the air according to the velocity of the wings and generate the translatory movement. It will also be apparent that by reason of the fact that one wing is arranged above and behind the other adjacent wing according to the angle of the helix, drag will be reduced to the minimum. It will also be apparent that by having two groups of wings, the wings of each group arranged in the form of a helix on the same or a common section of a driving shaft, the aerodynamic balance of an aircraft will not be materially affected.

Claims:

1. A helicopter comprising a rotatable shaft, and groups of airfoils, the airfoils of each group extending radially outward from the shaft in spaced relation with respect to each other and also helically arranged with respect to the axis of the shaft, each succeeding airfoil having its leading edge disposed above the trailing edge of the next preceding airfoil.

2. A helicopter comprising a rotatable shaft, and groups of airfoils, the airfoils of each group extending radially outward from a common section of the shaft in spaced relation with respect to each other and also helically arranged with respect to the axis of the shaft, each succeeding airfoil having its leading edge disposed above the trailing edge of the next preceding airfoil.

CHARLES E. HICKS.
WILLIAM GRANT HICKS.